United States Patent
Rakshit et al.

(10) Patent No.: US 10,664,047 B2
(45) Date of Patent: May 26, 2020

(54) DISPLAYING VISUALLY ALIGNED CONTENT OF A MOBILE DEVICE

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/982,064

(22) Filed: May 17, 2018

(65) Prior Publication Data

US 2019/0354169 A1 Nov. 21, 2019

(51) Int. Cl.
*G06F 3/01* (2006.01)
*G06F 1/16* (2006.01)

(52) U.S. Cl.
CPC ............ *G06F 3/012* (2013.01); *G06F 1/1686* (2013.01); *G06F 1/1694* (2013.01); *G06F 2200/1614* (2013.01); *G06F 2200/1637* (2013.01)

(58) Field of Classification Search
CPC ....................................................... G06F 3/012
(Continued)

(56) References Cited

U.S. PATENT DOCUMENTS

| 8,947,355 | B1 * | 2/2015 | Karakotsios | ............ | G06F 3/017 |
| | | | | | 345/158 |
| 9,134,799 | B2 * | 9/2015 | Mark | .................... | G06F 1/1639 |

(Continued)

FOREIGN PATENT DOCUMENTS

EP 2593848 5/2013

OTHER PUBLICATIONS

Cervantes, "Samsung files patent for smartphone that can display holographic images", https://www.androidauthority.com/samsung-patent-smartphone-holographic-images-633167/, Android Authority, Aug. 11, 2015, 4 pages.

(Continued)

*Primary Examiner* — Javid A Amini
(74) *Attorney, Agent, or Firm* — James Nock; Andrew D. Wright; Roberts Calderon Safran & Cole, P.C.

(57) ABSTRACT

Systems and methods for the display of visually aligned content are disclosed. In embodiments, method comprises: determining a relative angular orientation of a display of a mobile device based on real-time sensor data from one or more sensors; determining a facial direction of a user relative to the mobile device using real-time image data from one or more cameras of the mobile device; determining that the facial direction of the user does not align with the relative angular orientation of the display; dynamically determining a configuration of an adjustable display area for displaying the content to the user based on the relative angular orientation of the display and the user's facial direction; and initiating the display of the content on the adjustable display area, wherein at least a portion of the adjustable display area comprises a virtual display created by one or more projectors of the mobile device.

20 Claims, 6 Drawing Sheets

(58) Field of Classification Search
USPC .................................................... 345/659
See application file for complete search history.

(56) References Cited

U.S. PATENT DOCUMENTS

| | | | | |
|---|---|---|---|---|
| 9,342,143 | B1* | 5/2016 | Rhodes | G06F 3/013 |
| 9,437,038 | B1* | 9/2016 | Costello | G06T 15/08 |
| 2010/0066763 | A1* | 3/2010 | MacDougall | G06F 1/1626 |
| | | | | 345/656 |
| 2012/0057064 | A1* | 3/2012 | Gardiner | G06F 1/1626 |
| | | | | 348/333.12 |
| 2012/0206332 | A1* | 8/2012 | Yonemoto | G06F 1/1694 |
| | | | | 345/156 |
| 2013/0129145 | A1* | 5/2013 | Ye | G06K 9/00221 |
| | | | | 382/103 |
| 2013/0195204 | A1* | 8/2013 | Reznik | H04N 19/85 |
| | | | | 375/240.26 |
| 2013/0201219 | A1* | 8/2013 | Zhao | G06F 3/012 |
| | | | | 345/649 |
| 2014/0267006 | A1* | 9/2014 | Raffa | G06F 1/1626 |
| | | | | 345/156 |
| 2015/0085621 | A1* | 3/2015 | Hong | G04G 21/00 |
| | | | | 368/10 |
| 2015/0102995 | A1 | 4/2015 | Shen et al. | |
| 2015/0123966 | A1* | 5/2015 | Newman | G06T 19/006 |
| | | | | 345/419 |
| 2015/0254043 | A1* | 9/2015 | Hwang | G06F 3/1423 |
| | | | | 345/1.1 |
| 2015/0309564 | A1 | 10/2015 | Van Lier | |
| 2015/0358442 | A1 | 12/2015 | Cathey, Jr. et al. | |
| 2016/0077592 | A1* | 3/2016 | Bhesania | G06F 3/011 |
| | | | | 345/650 |
| 2016/0109953 | A1 | 4/2016 | Desh | |
| 2018/0284454 | A1* | 10/2018 | Reed | G02B 27/0172 |
| 2019/0007618 | A1* | 1/2019 | Sokeila | H04N 5/2252 |

OTHER PUBLICATIONS

Hughes, "Samsung patents wearable projector device that turns your hand into a display", https://www.ibtimes.co.uk/samsung-patents-wearable-projector-device-that-turns-your-hand-into-display-1560308, International Business Times, May 16, 2016, 3 pages.

* cited by examiner

DISPLAYING VISUALLY ALIGNED CONTENT OF A MOBILE DEVICE

BACKGROUND

The present invention relates generally to the display of content on a computing device and, more particularly, to displaying visually aligned content of a mobile computing device.

Mobile device users may change the orientation mode of content on a mobile device screen between a portrait layout and a landscape layout by physically rotating the mobile device. In this way, a user may change the dimension of content displayed (e.g., a video shown in landscape mode is larger than a video displayed in portrait mode) based on the physical dimensions of the mobile device screen. The terms portrait and landscape refer to whether a document or content is oriented vertically or horizontally. A landscape layout mode enables the display of content that is wider than it is tall (e.g., a short side of a page runs from top to bottom), while a portrait layout mode enables the display of content that is taller than it is wide (e.g., a longer side of a page runs from top to bottom).

Typically, computing devices define landscape and portrait layout modes with respect to a physical display area (e.g., physical display screen). For example, a smartphone device may define a first long side of the smartphone as the top and an opposing long side of the smartphone as the bottom for content display purposes in a landscape layout mode. Similarly, the smartphone device may define a first short side of the smartphone as the top and an opposing short side of the smartphone as the bottom for content display purposes in a portrait layout mode. Mobile devices may include a default setting wherein the mobile device does not have a defined content viewing layout, thus requiring a user to physically change the alignment of the mobile device (i.e. rotate the device) to change the display layout mode. For example, if a user rotates the mobile device such that a long side of the mobile device is horizontally aligned, then the mobile device may change the display of content to a landscape layout mode. Alternatively, if a user rotates the mobile device such that a short side of the mobile device is horizontally aligned, then the mobile device may change the display of content to a portrait layout mode.

SUMMARY

In an aspect of the invention, a computer-implemented method includes: determining, by a mobile device, a relative angular orientation of a physical display of the mobile device based on real-time sensor data from one or more sensors of the mobile device; determining, by the mobile device, a facial direction of a user relative to the mobile device using real-time image data from one or more cameras of the mobile device; determining, by the mobile device, that the facial direction of the user does not align with the relative angular orientation of the physical display; dynamically determining, by the mobile device, a configuration of an adjustable display area for displaying the content to the user based on the relative angular orientation of the physical display and the user's facial direction; and initiating, by the mobile device, the display of the content on the adjustable display area, wherein at least a portion of the adjustable display area comprises a virtual display created by one or more projectors of the mobile device.

In another aspect of the invention, there is a computer program product for the display of visually aligned content. The computer program product comprises a computer readable storage medium having program instructions embodied therewith. The program instructions are executable by a mobile device to cause the mobile device to: determine a relative angular orientation of a physical display of the mobile device based on real-time sensor data from one or more sensors of the mobile device; determine a facial direction of a user relative to the mobile device using real-time image data from one or more cameras of the mobile device; determine that the facial direction of the user does not align with the relative angular orientation of the physical display; dynamically determine a configuration of an adjustable display area for displaying the content to the user based on the relative angular orientation of the physical display and the user's facial direction; and initiate the display of the content on the adjustable display area in a content layout mode, wherein a portion of the adjustable display area comprises a virtual display created by the projection of content by one or more projectors of the mobile device, wherein the content is projected towards the user's facial direction, and wherein the content layout mode is independent of an orientation of the physical display.

In another aspect of the invention, there is a system for the display of visually aligned content. The system includes: one or more sensors; one or more cameras; one or more content projectors adapted to project content on a virtual display; a physical display adapted to display content to a user; a CPU, a computer readable memory and a computer readable storage medium associated with the mobile device; program instructions to determine a relative angular orientation of the physical display based on real-time sensor data from the one or more sensors; program instructions to determine a facial direction of a user relative to the mobile device using real-time image data from the one or more cameras; program instructions to determine that the facial direction of the user does not align with the relative angular orientation of the physical display; program instructions to dynamically determine a configuration of an adjustable display area for displaying the content to the user based on the relative angular orientation of the physical display and the user's facial direction; and program instructions to initiate the display of the content on the adjustable display area, wherein the adjustable display area comprises the virtual display and the physical display, wherein the program instructions are stored on the computer readable storage medium for execution by the CPU via the computer readable memory.

BRIEF DESCRIPTION OF THE DRAWINGS

The present invention is described in the detailed description that follows, in reference to the noted plurality of drawings by way of non-limiting examples of exemplary embodiments of the present invention.

DETAILED DESCRIPTION

Figure 1:
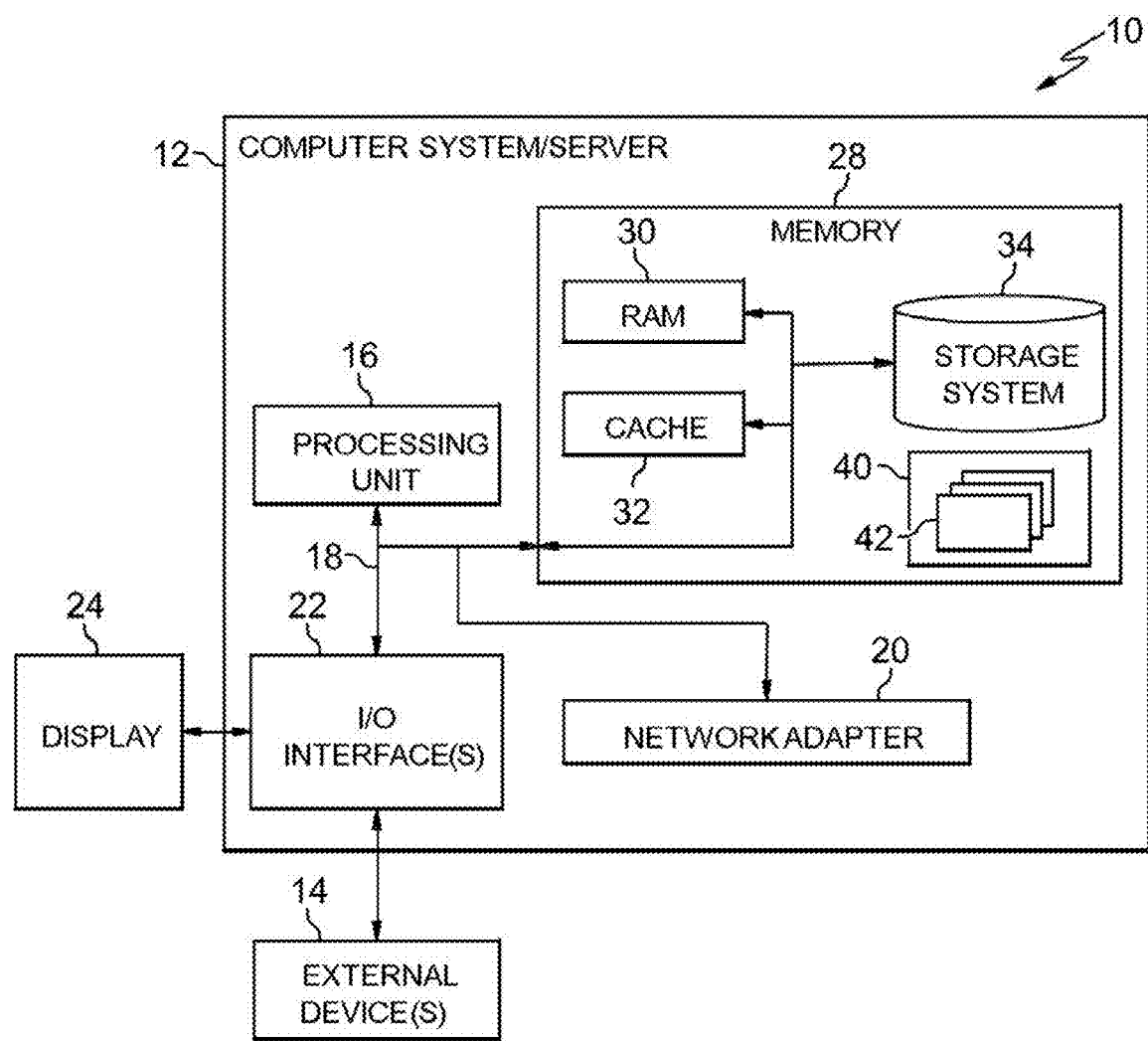
FIG. 1 depicts a computing infrastructure according to an embodiment of the present invention.

The present invention relates generally to the display of content on a computing device and, more particularly, to displaying visually aligned content of a mobile computing device. In embodiments, a mobile computing device (hereafter mobile device) enables the identification of a user's facial direction and facial position relative to the mobile device (e.g., relative to an angular direction or axis of the mobile device) to determine if the user's facial direction aligns with the mobile device in a manner that enables the user to view content on a physical display of the mobile device. In aspects, the mobile device includes a physical display for displaying desired content, and one or more projectors configured to project a virtual display for displaying content. In embodiments, if the user's facial direction does not align with the mobile device, the mobile device determines dimensions for the combined physical and virtual display, and using a projector, projects at least a portion of desired content using the virtual display in a manner that aligns with the user's facial direction. If the user's facial direction aligns with the mobile device, the mobile device displays the desired content on the physical display only.

In embodiments, the mobile device determines if the type of content to be viewed is mapped to a predetermined display layout mode (e.g., landscape or portrait layouts), and the mobile device displays the desired content in the appropriate display layout mode, either by the physical display, virtual display, or a combination thereof. The mobile device may map content based on predetermined rules, manually, or based on user preference data. In this way, the display of content is not automatically displayed on the physical display in either a landscape or portrait mode based on orientation of the physical display of the mobile device, but is instead displayed based on the viewer's relationship to the device, as well as the type of content being viewed.

Advantageously, embodiments of the invention enable the display of content using a mobile device when the dimensions of the content are greater than the dimensions of the mobile device screen. Additionally, embodiments of the invention enable a user to view content in a predetermined layout mode (e.g., portrait or landmark orientations) based on content type, regardless of the physical orientation of the mobile device. Thus, embodiments of the invention provide technical solutions to problems associated with displaying content on mobile computing devices. Moreover, embodiments of the invention constitute improvements in computer functionality, by adding unconventional content display functionality to mobile computing devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
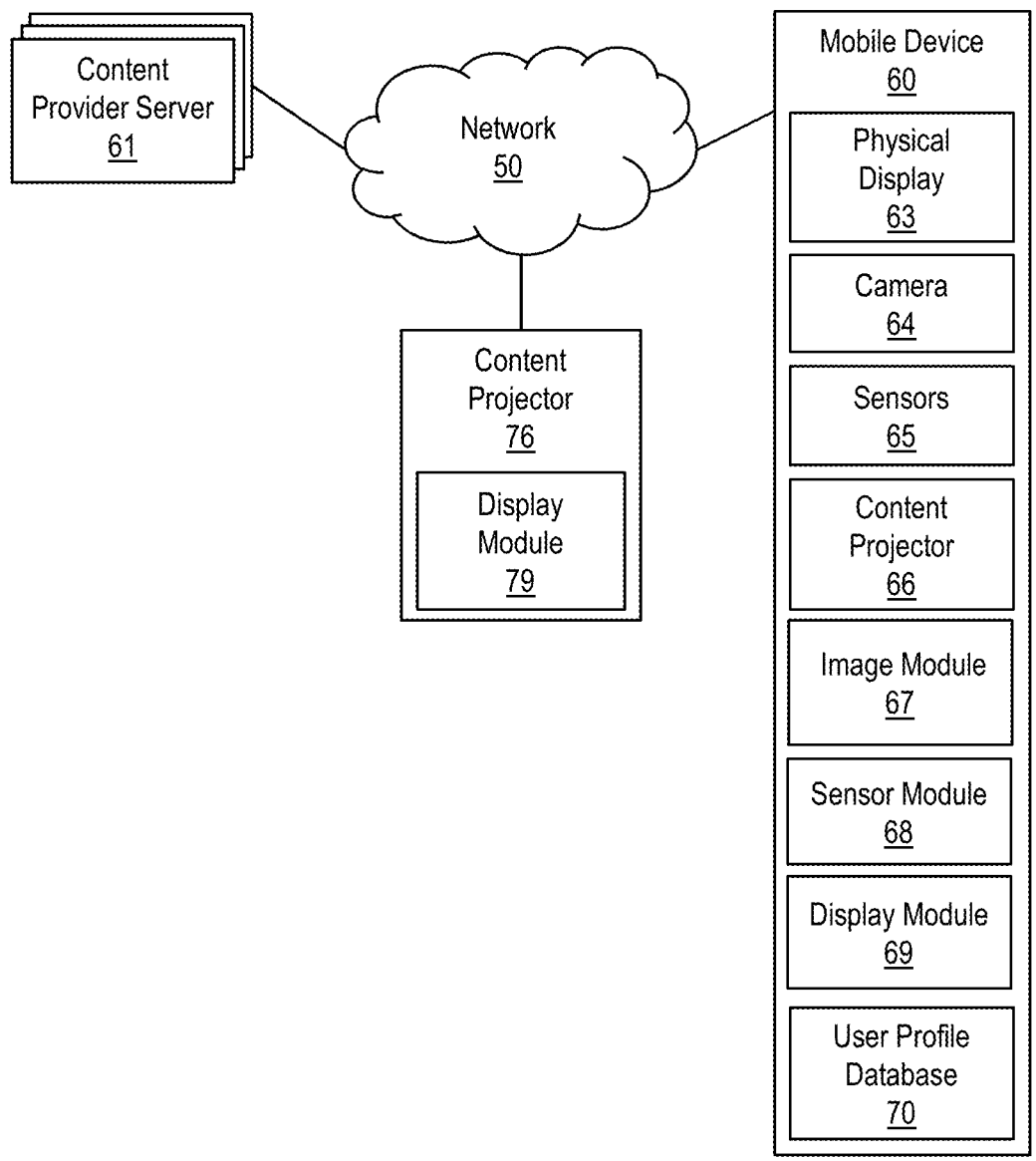
FIG. 2 shows an exemplary environment in accordance with aspects of the invention.

FIG. 2 shows an exemplary environment in accordance with aspects of the invention. The environment includes a network 50 (e.g., internet) enabling communication between a mobile computing device (hereafter mobile device) 60 and one or more content provider servers 61. The mobile device 60 may comprise a computer system 12 of FIG. 1, and may be connected to the network 50 via the network adapter 20 of FIG. 1. The mobile device 60 may be a smartphone, laptop computer, tablet computer, or other type of mobile computing device. The mobile device 60 may be configured as a special purpose computing device, such as a smartphone with enhanced content viewing capabilities. For example, the mobile device 60 may include a physical display 63, one or more digital cameras represented at 64, one or more sensors (e.g., gyroscopes, accelerometers, magnetometers, global positioning system, etc.) represented at 65, and one or more content projectors represented at 66. In embodiments, the one or more content projectors 66 are built-in to the mobile device 60 (e.g., built-in to the physical boundaries of the mobile device 60). The sensors 65 may include touch sensors, motion sensors, or the like for detecting a user's actions with respect to the physical display 63 or a virtual display (not shown) created by the one or more content projectors 66. In embodiments, the sensors 65 provide data to enable the determination of location, device angle and position, and movement. The one or more digital cameras 64 may be built-in cameras, cameras in the form of add-on attachments for the mobile device 60, remote cameras in communication with the mobile device 60, or combinations thereof. In embodiments, the physical display 63 is in the form of a touch screen. In aspects, the physical display 63 supports the display of content in a landscape mode or a portrait mode.

The network 50 may be any suitable communication network or combination of networks, such as a local area network (LAN), a general wide area network (WAN), and/or a public network (e.g., the Internet). The content provider server 61 may be in the form of the computing device 12, and may be a desktop computer, laptop computer, tablet computer, smartphone, or other computing device capable of providing content (e.g., digital videos, text, photographs, etc.) to the mobile device 60.

In embodiments, the mobile device 60 includes one or more modules, which may be comprised of one or more program modules (e.g., program module 42 of FIG. 1) executed by the mobile device 60, configured to perform one or more of the functions described herein. In embodiments, the mobile device 60 includes an image module 67 configured to detect a user's facial direction through the analysis of image data from the camera 64. In aspects, the image module 67 is configured to detect a user's actions with respect to the physical display 63 and/or a virtual display created by the content projector 66.

In aspects, the mobile device 60 includes a sensor module 68 configured to determine a relative angular orientation of the mobile device 60 based on sensor data from the sensors 65. The sensor module 68 may be configured to determine a user's actions with respect to the physical display 63 and/or a virtual display created by the content projector 66 based on sensor data from the sensors 65. For example, motion detecting sensors may provide data regarding a user's hand movements with respect to a virtual display in order to detect when a user is "interacting" with the virtual display.

In embodiments, the mobile device 60 includes a display module 69 configured to determine a display configuration, and to display content on the physical display 69 based on the display configuration. In aspects, the display module 69 is configured to determine a display configuration, and to display content on a virtual display through use of the content projector 66. In embodiments, the display module 69 determines if the physical display 63 is aligned with a user's facial direction, and based there 90, determines whether to display content on the physical display 63, a virtual display through use of the content projector 66, or a combination thereof. The display module 69 may be configured to determine that a content-free portion of the physical display 63 is an available display area, and cause supplemental content (e.g., advertising) to be displayed in the available display area.

With continued reference to FIG. 2, in embodiments, the mobile device 60 may be in communication with one or more content projectors represented at 76, which are separate from the mobile device 60, such as through a direct connection or a wireless connection (e.g., network 50). In aspects, the content projectors 76 include a display module 79 configured to determine a display configuration, and to display content on a virtual display created by one or more of the content projectors 66 and 76. In aspects, the display module 79 of the content projector 76 may communicate with the display module 69 of the mobile device 60 to display content on the physical display 63, on a virtual display created by one or more of content projectors 66 and 76, or a combination of the physical display 63 and the virtual display. The one or more content projectors 76 may be in the form of a wearable projector, a content projector adapted to be physically connected to the mobile device 60, or other type of content projector in communication with the mobile device 60.

Content projector 66 and content projector 76 may comprise one or more types of projectors, such as a pico-projector or a holographic projector. In embodiments, the content projector 66 comprises a combination of a pico-projector and a holographic projector. Content projectors 66 and 76 may be placed in any desirable arrangement with respect to the mobile device 60, so long as the arrangement enables the display of content on both the physical display 63 and a virtual display created by the content projector (e.g. 66, 76) in accordance with embodiments of the invention. For example, the content projector 66 may be arranged at a top portion, side portion, or bottom portion of the mobile device 60 adjacent the physical display 63 and may be arranged to project a virtual display (not shown in FIG. 2)

beyond the physical dimensions of the mobile device 60. The position of the content projectors 66 and 76 with respect to the main body of the mobile device 60 may vary, and is not limited to any examples discussed herein. The content projectors 66 and 76 of the present invention may utilize existing projector technology.

In embodiments, the mobile device 60 further comprises a user profile database 70 for storing user preference data regarding the layouts (e.g., landscape or portrait orientations) of content projected by the content projectors 66, 76, and other user profile data. In aspects, the user profile database 70 may contain user authentication information.

In embodiments, the mobile device 60 may include additional or fewer components than those shown in FIG. 2. In embodiments, separate components may be integrated into a single computing component or module. Additionally, or alternatively, a single component may be implemented as multiple computing components or modules.

The quantity of devices and/or networks in the environment of FIG. 2 is not limited to what is shown in FIG. 2. In practice, the environment of FIG. 2 may include additional devices and/or networks; fewer devices and/or networks; different devices and/or networks; or differently arranged devices and/or networks than illustrated in FIG. 2.

Figure 3:
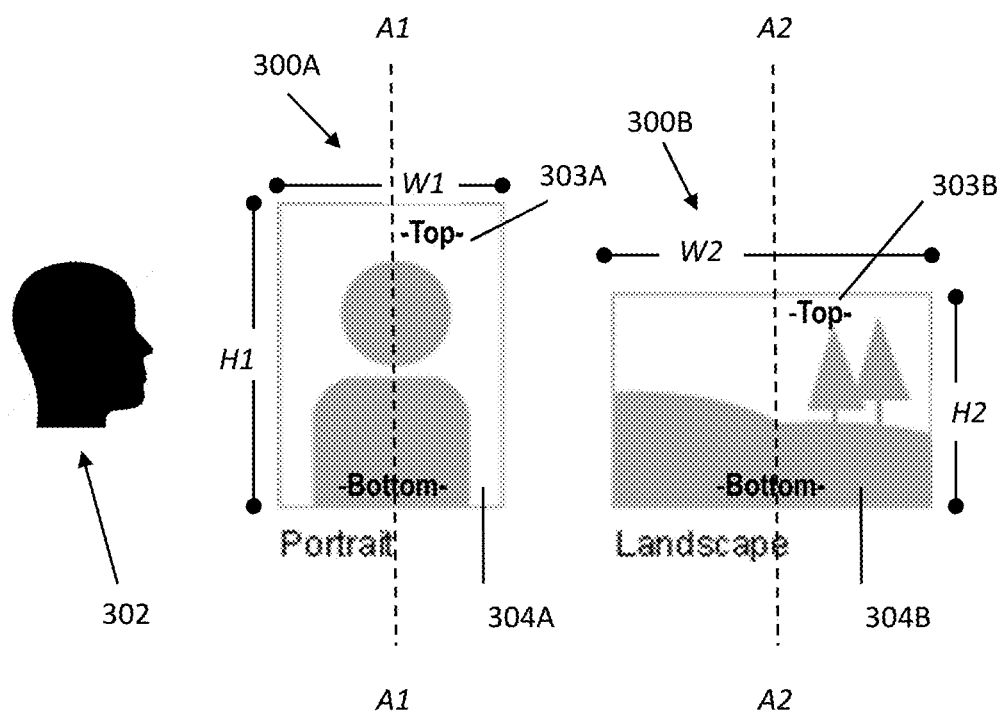
FIG. 3 depicts exemplary content layout modes of the present invention.

FIG. 3 depicts exemplary content layout modes of the present invention. The term landscape layout or landscape layout mode as used herein refers to a layout of content whereby content is displayed in a manner that is wider than it is tall (e.g., a short side of a page runs from top to bottom with respect to a display). The term portrait layout or portrait layout mode as used herein refers to a layout of content wherein the content is displayed in a manner that is taller than it is wide (e.g., a longer side of a page runs from top to bottom with respect to a display). In the example of FIG. 3, content 300A is shown in a portrait layout mode, wherein a height H1 of the content 300A is great then the width W1 of the content 300A, as viewed from the perspective of a user 302. As depicted, a top 303A and a bottom 304A of the content 300A are defined based on the perspective of the user 302 (i.e., top 303A and bottom 304A defined along a horizontal axis A1). Content 300B is shown in a landscape layout mode, wherein a height H2 of the content 300B is less than the width W2 of the content 300B, as viewed from the perspective of the user 302 (i.e., top 303B and bottom 304B defined along a horizontal axis A2).

Figure 4A:
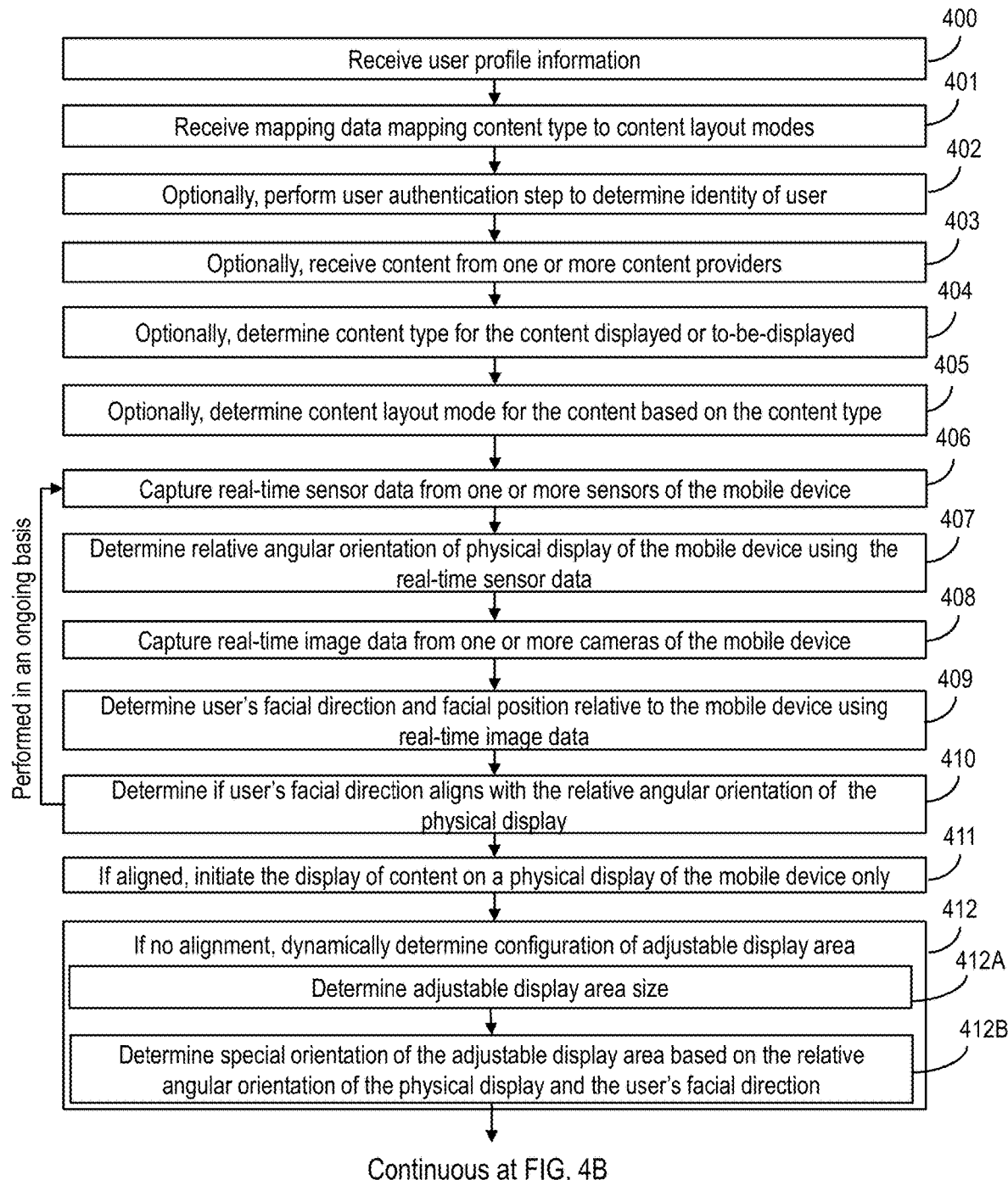
FIGS. 4A and 4B show a flowchart of steps of a method in accordance with aspects of the invention.
Figure 4B:
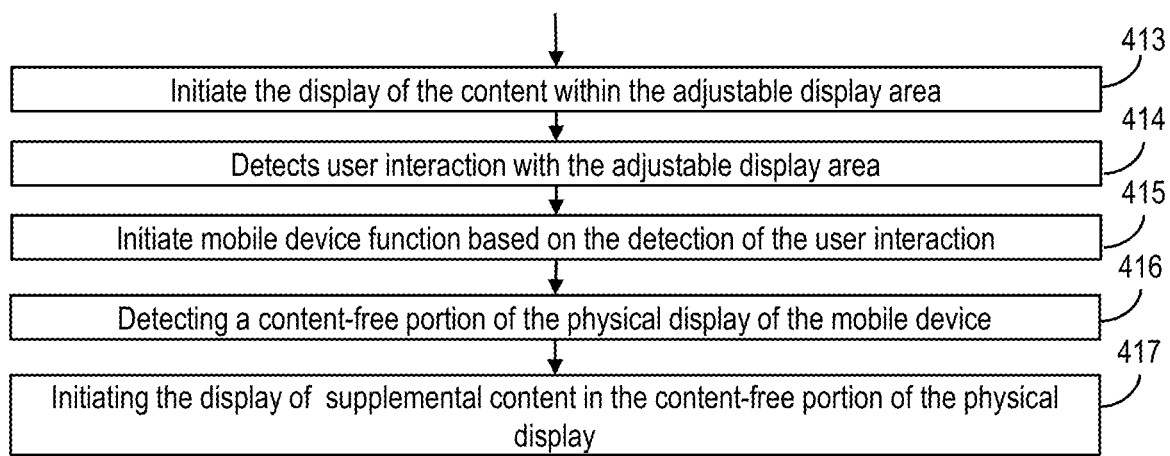

FIG. 4 shows a flowchart of a method in accordance with aspects of the invention. Steps of the method of FIG. 4 may be performed in the environment illustrated in FIG. 3, and are described with reference to elements shown in FIG. 3.

At step 400 the mobile device 60 receives user profile information. In embodiments, user profile information is received by the mobile device 60 from direct user input (e.g., via a graphical user interface) and saved locally (e.g., user profile database 70) or remotely (e.g., cloud-based user profile storage not shown). Alternatively, the user profile information may be received through a remote server (not shown) in communication with the mobile device 60. The user profile information may include user preference data regarding content layout modes. For example, user preference data may comprise content layout preferences (landscape or profile layouts) for each of a plurality of different content types, wherein the layout types are defined with respect to the user viewing the content. In embodiments, user content layout preferences apply only to the display of content across both a virtual display and the physical display 63, in combination. In one example, a user may indicate that he/she prefers all digital video content to be displayed in a landscape layout and prefers text messages to be displayed in a portrait layout.

At step 401, the mobile device 60 receives data (e.g., mapping data) which maps content type (e.g., video, photograph, text message, etc.) to content layout modes (e.g., landscape or portrait layout). In embodiments, the mapping data applies only to the display of content across both a virtual display and the physical display 63, in combination. In embodiments, the mapping data is received by the mobile device 60 from direct user input (e.g., via a graphical user interface) and saved locally (e.g., user profile database 70) or remotely (e.g., cloud-based user profile storage not shown). Alternatively, the mobile device 60 may receive mapping data through a remote server (not shown) in communication with the mobile device 60. For example, the following content type to layout mode type pairings may be including in the mapping data:
- movie video: landscape layout mode
- social textual content: portrait layout mode
- photographs: match layout mode to layout format of image.

At step 402, the mobile device 60 optionally performs a user authentication step to determine and/or verify an identity of a user. In embodiments, one or more users may be associated with the mobile device 60, wherein each of the users is associated with a respective user profile stored in the user profile database (e.g., user profile database 70). In embodiments, the mobile device 60 identifies a user profile to utilize in the display of content based on the identification of the user through the authentication step 401. Alternatively, when only one user is associated with the mobile device 60, the authentication step 401 may be skipped.

At step 403, the mobile device 60 optionally receives content from one or more content provider servers 61. The content received from the one or more content provider servers 61 may be displayed and viewed by a user in accordance with the method steps of FIGS. 4A and 4B outlined below. It should be understood that content obtained directly by the mobile device (e.g., digital photographs from the one or more cameras 64, etc.) may also be displayed and viewed in accordance with the method steps of FIGS. 4A and 4B below.

At step 404, the mobile device 60 optionally determines content type (i.e., the type of content) for the content displayed or to-be-displayed by the mobile device 60. Content types may include, for example, digital videos, text messages, digital photographs, web browsers, etc. The mobile device 60 may use any technique for determining content type, such comparing file type from metadata of the content to a lookup table mapping content type to file type.

At step 405, the mobile device 60 optionally determines a content layout mode (e.g., portrait layout or landscape layout) for the content displayed or to-be-displayed by the mobile device 60 based on the content type determined at step 404. In embodiments, the mobile device 60 determines the content layout mode based on user preference data from the user profile database 70. For example, the mobile device 60 may determine that a streaming video displayed by the mobile device 60 is a digital video in accordance with step 404, and may determine that the user prefers to watch digital videos in a landscape layout based on user profile data in the user profile database 70. Alternatively, the mobile device 60 may determine a content layout mode based on predetermined or default layout rules (e.g., mapping data received at step 401). For example, predetermined layout rules may require the display of all digital videos in a landscape layout.

Content layout may be determined based on individual users, groups of users, or based on the mobile device 60 itself.

At step 406, the mobile device 60 captures real-time sensor data from the one or more sensors 65 of the mobile device 60. In embodiments, the sensor data comprises data from at least one of the following sensors: accelerometer, gyroscope, global positioning system, and magnetometer. Existing sensor technology and methods may be utilized in the performance of step 406.

At step 407, the mobile device 60 determines a relative angular orientation of the physical display 63 of the mobile device 60 using the real-time sensor data from step 406. In embodiments, the mobile device 60 determines the angular orientation of the physical display of the mobile device 60 in real-time based on the real-time sensor data. This step may occur when a user holds the mobile device 60, or when the mobile device 60 is on a stationary surface, for example. In embodiments, the sensor module 68 of the mobile device 60 determines a relative angular orientation of an axis of the mobile device 60 with respect to a predetermined reference point based on the real-time sensor data received from the sensors 65.

At step 408, the mobile device 60 captures real-time image data from the one or more cameras 64 of the mobile device 60. The mobile device 60 may utilize existing image capture technology and methods in the performance of step 408.

At step 409, the mobile device 60 determines the user's facial direction relative to the mobile device 60 using the real-time image data from step 408. In aspects, the mobile device 60 also determines the user's facial position (e.g., tilt of a user's head) relative to the mobile device 60 using the real-time image data from step 408. In embodiments, the image module 67 determines the user's facial direction (e.g., facial viewing direction) and facial position relative to the mobile device 60 using image recognition techniques (e.g., facial recognition technology and methods). In aspects, step 409 includes the image module 67 determining the user's head tilt (e.g., facial position) relative to the mobile device 60. In embodiments, the mobile device 60 determines the user's facial direction and facial position relative to an axis of the mobile device 60 based on the real-time image data and the relative angular orientation of the physical display 63 determined at step 407. Typically, a user's actual facial direction and eye focus are in the same direction. Accordingly, in aspects, the mobile device 60 determines a user's facial direction at step 409 based on a viewing angle of a user's eye relative to an object they have focused their eye(s) on.

At step 410, the mobile device 60 determines if the user's facial direction, determined at step 409, aligns with the relative angular orientation of the physical display 63 determined at step 407. In embodiments, the display module 69 of the mobile device 60 performs step 410. The mobile device 60 may utilize a plurality of mathematical techniques to determine if the user's facial direction aligns with the relative angular orientation of the physical display 63. In embodiments, alignment is determined based on the position of a user's head and eye focus for a given content type, and the relative angular orientation of physical display 63 of the mobile device 60. In aspects, the mobile device 60 utilizes a database of predetermined angular relationships that "align" for purposes of the present invention in the determination of step 410.

One of ordinary skill in the art would be capable of selecting a method for determining if a user's facial direction is aligned with the relative angular orientation of the physical display 63, such that detailed calculations are not presented herein. For example, using a 360 degree measurement, if a user's facial direction is angled at 20 degrees to the right with respect to the physical display 63 (with displayed content in portrait mode), the user may see the content on the physical display 63 using his or her peripheral vision, but it may be more desirable to position the content in landscape mode at an angle that is more aligned with the user's facial direction. In this example, the mobile device 60 may determine that there the user's facial direction does not align with the relative angular orientation of the physical display 63 when the user's facial direction is 20 degrees or more from the relative angular orientation of the physical display 63. Step 410 may commence based on a triggering event, such as a user selecting content for display by the mobile device 60 or the display of content on the physical display 63, or may be performed on an periodic or ongoing basis. In embodiments, mobile device 60 performs the steps 406-410 in an ongoing basis, in order to evaluate alignment continuously.

At step 411, in the event the mobile device 60 determines that the user's facial direction aligns with the relative angular orientation of the physical display 63, then the mobile device 60 initiates the display of the content on the physical display 63 of the mobile device 60 only. In embodiments, the display module 69 performs step 411. The mobile device 60 may utilize existing display techniques in the performance of step 411.

At step 412, in the event the mobile device 60 determines that the user's facial direction does not align with the relative angular orientation of the physical display 63, then the mobile device 60 determines a configuration for an adjustable display area, wherein the adjustable display area includes at least a portion of content for display by a virtual display. The term adjustable display area as used herein refers to a content display area that incorporates, at least in part, a virtual display, and which may incorporate both the virtual display and the physical display 63. The configuration comprises the size and spatial (directional) orientation of the adjustable display area. In embodiments, the configuration is determined based in part on the content layout mode of step 405. In aspects, the display module 69 of the mobile device 60 performs step 412. The determination of the configuration may include substeps 412A and 412B detailed below.

In embodiments, at step 412A the display module 69 determines a size of the adjustable display, which may include a portion of content to be displayed on the physical display 63 and another portion of the content to be displayed on a virtual display generated by one or more of the content projectors 66, 76. The adjustable display size may be determined based on user preference data and/or the content layout mode determined at step 405. For example, user preference data stored in the user profile database 70 may indicate that a user wishes to view certain types of content at a maximum size, regardless of the dimensions of the physical display 63. Accordingly, the mobile device 60 may determine that an adjustable display size for digital video content to be displayed by the mobile device 60 is S×2, wherein the display size of the physical display 63 is only S. In another example, the display module 69 may determine that the content is to be displayed in a landscape layout based on the determination of step 405, and calculates the size of the adjustable display area based on the content being displayed in the landscape layout mode. The maximum size of the adjustable display area may vary depending on the capabilities of the one or more content projectors 66, 67 and the size of the physical display 63. The size of the adjustable display area may not exceed the total display size provided by the physical display 63 plus a virtual display created by the one or more content projectors 66, 67.

In embodiments, at step 412B the display module 69 determines a directional orientation (special or three-dimensional orientation) of the adjustable display area based on the relative angular orientation of the physical display determined at step 405, and the user's facial direction determined at step 409. The display module 69 may also determine the directional orientation based on limitations imposed by the hardware utilized (e.g., physical display 63 and content projectors 66, 76). For example, the content projector 66 may be configured to project a virtual display within a limited three-dimensional virtual display area. Accordingly, the directional orientation of the adjustable display would be limited to directional orientations within the bounds of the virtual display area.

At step 413, the mobile device 60 initiates the display of the content within the adjustable display area, wherein the mobile device 60 projects the content towards the user's viewing direction. The display of the content may comprise a virtual display created by one or more of the content projectors 66, 76, or a combination of the virtual display and the physical display 63. In embodiments, the display module 69 performs step 413, either alone or in combination with one or more display module 79 of one or more external content projectors 76. In aspects, the mobile device 60 initiates the display of content by sending instructions to the content projector 66 to project a first portion of content via a virtual display while displaying a second portion of the content within the physical display 63, such that the adjustable display area comprises both the physical display 63 and the virtual display. Step 413 enables the user to view the content in such a way that the user does not have to rotate the physical display 63 or change their own position with respect to the mobile device 60 in order to view the content.

At step 414, the mobile device 60 detects a user interaction with the adjustable display area. The user interaction may comprise the user interacting (e.g., touching) the physical display 63) or interacting with the virtual display created by the one or more content projectors 66, 76 at step 413. Various methods of detecting a user's interaction with the virtual and/or physical display may be utilized in accordance with step 414. For example, sensors 65 of the mobile device 60 may detect gestures of a user's hand or finger with respect to the virtual and/or physical display 63 associated with scrolling, zooming, typing, etc. The one or more cameras 64 of the mobile device 60 may also track a user's movements (e.g., hand or finger movements) with respect to the virtual and/or physical display 63. In aspects, the mobile device 60 may detect a user-performed gesture, which continues from the physical display 63 onto the virtual display, or vice versa.

At step 415, the mobile device 60 initiates a mobile device function based on the user interaction detected at step 414. For example, the mobile device 60 may detect a gesture associated with scrolling, and may initiate scrolling of content through the adjustable display area. In another example, the mobile device 60 may detect a gesture associated with typing, and may initiate the addition of text to the content displayed on the adjustable display area.

At step 416, the mobile device 60 determines or detects a content-free portion of the physical display 63. In embodiments, the display module 69 of the mobile device 60 determines that a portion of the physical display 63 is free of content and is available for the display of supplemental content. Various techniques for determining the content free portions may be utilized by the mobile device 60 in the performance of step 416.

At step 417, the mobile device 60 initiates the display of the supplemental content on the content-free portion of the physical display 63. In embodiments, the display module 69 performs step 417. The supplemental content may be, for example, one or more advertisements.

Figure 5A:
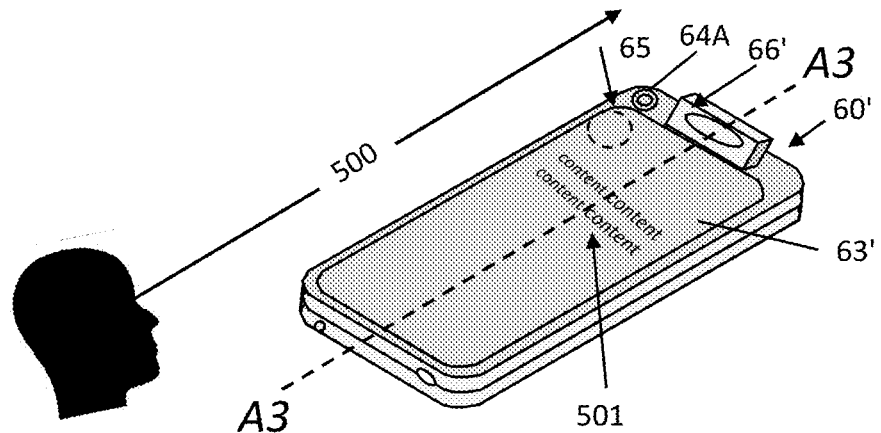
FIG. 5A illustrates the alignment of a user's facial direction with a relative angular orientation of a mobile device of the present invention.

FIG. 5A illustrates the alignment of a user's facial direction with a relative angular orientation of a mobile device of the present invention. FIG. 5A depicts a front perspective view of a mobile device of the present invention. Steps described with reference to FIG. 5A may be performed in the environment illustrated in FIG. 3.

In embodiments, the mobile device 60 is in the form of a smartphone 60' as depicted in FIG. 5A. In the exemplary embodiment shown, the smartphone 60' includes a projector 66 in the form of a pico-projector 66' adapted to project content beyond the physical dimensions of the smartphone 60' on a virtual display (not depicted in FIG. 5A). Smartphone 60' also includes a front-facing camera 64A, a group of sensors 65 housed therein, and a physical display 63 in the form of a touchscreen 63'. In accordance with steps 406-410 of FIG. 4A, the smartphone 60' determines whether a user's facial direction (represented by line 500) aligns with a relative angular orientation of the physical display 63'. For illustrative purposes, the axis line A3 represents the relative angular orientation of the physical display 63'. In this example, the smartphone 60' determines that the user's facial direction 500 aligns with the relative angular orientation of the physical display 63'. Accordingly, the smartphone 60' initiates the display of content 501 on the touchscreen 63' in accordance with step 411 of FIG. 4A.

Figure 5B:
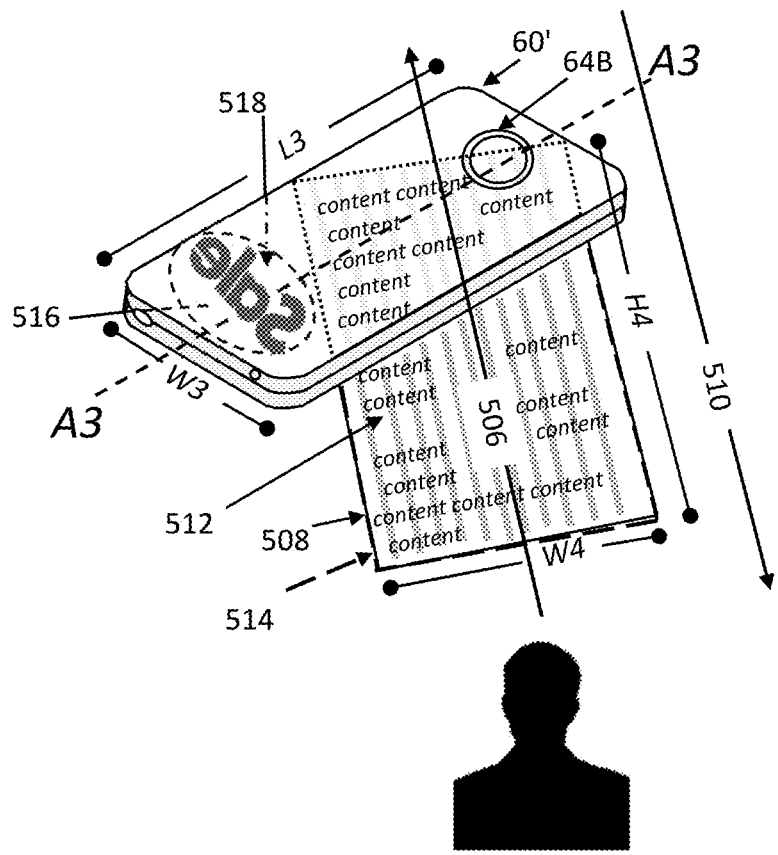
FIG. 5B illustrates an exemplary use scenario, wherein a user's facial direction does not align with a relative angular orientation of a mobile device of the present invention.

FIG. 5B illustrates an exemplary use scenario, wherein a user's facial direction does not align with a relative angular orientation of a mobile device of the present invention. FIG. 5B depicts a back perspective view of the smartphone 60' of FIG. 5A. Steps described with respect to FIG. 5B may be performed in the environment illustrated in FIG. 3.

In embodiments, the smartphone 60' includes a back-facing camera 64B, and has a size including a length (height) L3 and a width W3. In accordance with steps 406-410 of FIG. 4A, the smartphone 60' determines whether a user's facial direction (represented by line 506 in FIG. 5B) aligns with a relative angular orientation of the physical display 63'. For display purposes, the axis line A3 represents the relative angular orientation of the physical display 63'. In this example, the smartphone 60' determines that the user's facial direction 506 does not align with the relative angular orientation of the physical display 63'. Accordingly, the smartphone 60' dynamically determines a configuration of an adjustable display area 508 based on the relative angular orientation of the physical display 63' and the user's facial direction 506 in accordance with step 412 of FIG. 4A. In this example, the smartphone 60' determines that the adjustable display area 508 has a size including a height H4 and a width W4. In this example, the size of the adjustable display area 508 is larger than the size of the touchscreen 63'. Moreover, the smartphone 60' determines a directional orientation 510 of the adjustable display area 508, which aligns with the user's facial direction 506. In accordance with step 413 of FIG. 4B, the smartphone 60' initiates display of content 512 within the adjustable display area 508 utilizing the projector 66' (viewable in FIG. 5A), as well as the touchscreen 63' (viewable in FIG. 5A).

In the example of FIG. 5B, the smartphone 60' determines that the content 512 is a "list" type of content, and based on mapping data, determines that the content 512 should be displayed in a landscape layout. See steps 404 and 405 of FIG. 4A. Accordingly, the content 512 is displayed in a landscape layout across both the physical display (touchscreen 63') of the smartphone 60' and a virtual display 514 (represented by dashed lines) generated by the pico-projector 66' (viewable in FIG. 5A). In the example of FIG. 5B, the smartphone 60' also detects that the touchscreen 63' includes a content-free portion 516 in accordance with step 416 of FIG. 4B, and initiates the display of an advertisement 518 in accordance with step 417 of FIG. 4B.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for the display of visually aligned content. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, by a mobile device, a relative angular orientation of a physical display of the mobile device based on real-time sensor data from one or more sensors of the mobile device;
    determining, by the mobile device, a facial direction of a user relative to the mobile device using real-time image data from one or more cameras of the mobile device;
    determining, by the mobile device, that an axis of the physical display is at an angle with respect to the facial direction of the user that is greater than a predetermined threshold angle;
    dynamically determining, by the mobile device, a configuration of an adjustable display area for displaying the content to the user based on the relative angular orientation of the physical display and the user's facial direction; and
    initiating, by the mobile device, the display of the content on the adjustable display area, wherein at least a portion of the adjustable display area comprises a virtual display created by one or more projectors of the mobile device, a first portion of the content is displayed on the physical display, and a second portion of the content is displayed by the one or more projectors.

2. The method of claim 1, further comprising:
    determining, by the mobile device, a content type of the content; and
    determining, by the mobile device, a content layout mode of the content based on the content type,
    wherein the content layout mode comprises a landscape layout mode or a portrait layout mode,
    wherein the dynamically determining the configuration of the adjustable display area further comprises determining a size of the adjustable display area based on the content layout mode, and
    wherein the initiating the display of the content comprises initiating the display of the content in the determined content layout mode.

3. The method of claim 1, wherein the adjustable display area has a size that is greater than a size of the physical display of the mobile device.

4. The method of claim 1, wherein the configuration of the adjustable display area comprises a size of the adjustable display area and a directional orientation of the adjustable display area, wherein the directional orientation is based on the relative angular orientation of the physical display and the user's facial direction.

5. The method of claim 1, further comprising:
    determining, by the mobile device, a content type for the content; and
    determining, by the mobile device, a content layout mode for the content based on the content type, wherein the content layout mode comprises a landscape layout mode and a portrait layout mode, wherein the initiating the display of the content comprises initiating the display of the content in the determined content layout mode.

6. The method of claim 5, further comprising receiving, by the mobile device, mapping data that maps a plurality of content types to respective layout modes, wherein the determining the content layout mode for the content based on the content type is performed utilizing the mapping data.

7. The method of claim 1, further comprising:
    detecting, by the mobile device, a user interaction with the adjustable display area; and
    initiating, by the mobile device, a mobile device function based on the detection of the user interaction.

8. The method of claim 1, further comprising:
    detecting, by the mobile device, a content-free portion of the physical display; and
    initiating, by the mobile device, display of supplemental content in the content-free portion of the physical display.

9. A computer program product for the display of visually aligned content, the computer program product comprising a computer readable storage medium having program instructions embodied therewith, the program instructions executable by a mobile device to cause the mobile device to:
    determine a relative angular orientation of a physical display of the mobile device based on real-time sensor data from one or more sensors of the mobile device;
    determine a facial direction of a user relative to the mobile device using real-time image data from one or more cameras of the mobile device;

determine that the facial direction of the user does not align with the relative angular orientation of the physical display;
dynamically determine a configuration of an adjustable display area for displaying the content to the user based on the relative angular orientation of the physical display and the user's facial direction; and
initiate the display of the content on the adjustable display area in a content layout mode, wherein a portion of the adjustable display area comprises a virtual display created by the projection of content by one or more projectors of the mobile device,
wherein the content is projected towards the user's facial direction, and
wherein the content layout mode is independent of an orientation of the physical display.

10. The computer program product of claim 9, wherein the adjustable display area comprises the virtual display area and the physical display of the mobile device.

11. The computer program product of claim 9, wherein the adjustable display area has a size that is greater than a size of the physical display of the mobile device.

12. The computer program product of claim 9, wherein the configuration of the adjustable display area comprises a size of the adjustable display area and a directional orientation of the adjustable display area, wherein the directional orientation is based on the relative angular orientation of the physical display and the user's facial direction.

13. The computer program product of claim 9, further comprising program instructions to cause the mobile device to:
determine a content type for the content; and
determine a content layout mode for the content based on the content type, wherein the content layout mode comprises a landscape layout mode and a portrait layout mode, wherein the initiating the display of the content comprises initiating the display of the content in the determined content layout mode.

14. The computer program product of claim 13, further comprising program instructions to cause the mobile device to receive and store mapping data that maps a plurality of content types to respective layout modes, wherein the determining the content layout mode for the content based on the content type is performed utilizing the mapping data.

15. The computer program product of claim 9, further comprising program instructions to cause the mobile device to:
detect a user interaction with the adjustable display area; and
initiate a mobile device function based on the detection of the user interaction.

16. The computer program product of claim 9, further comprising program instructions to cause the mobile device to:
detect a content-free portion of the physical display; and
initiate display of supplemental content in the content-free portion of the physical display.

17. A mobile device for the display of visually aligned content, comprising:
one or more sensors;
one or more cameras;
one or more content projectors adapted to project content on a virtual display;
a physical display adapted to display content to a user;
a CPU, a computer readable memory and a computer readable storage medium associated with the mobile device;
program instructions to determine a relative angular orientation of the physical display based on real-time sensor data from the one or more sensors;
program instructions to determine a facial direction of a user relative to the physical display of the mobile device using real-time image data from the one or more cameras;
program instructions to determine that an axis of the physical display is at an angle with respect to the facial direction of the user that is greater than a predetermined threshold angle, indicating that the facial direction does not align with the relative angular orientation of the physical display;
program instructions to dynamically determine a configuration of an adjustable display area for displaying the content to the user based on the relative angular orientation of the physical display and the user's facial direction; and
program instructions to initiate the display of the content on the adjustable display area, wherein the adjustable display area comprises the virtual display and the physical display, a first portion of the content is displayed on the physical display, and a second portion of the content is displayed on the virtual display,
wherein the program instructions are stored on the computer readable storage medium for execution by the CPU via the computer readable memory.

18. The mobile device of claim 17, wherein the adjustable display area has a size that is greater than a size of the physical display of the mobile device.

19. The mobile device of claim 17, further comprising:
program instructions to determine a content type for the content; and
program instructions to determine a content layout mode for the content based on the content type, wherein the content layout mode comprises a landscape layout mode and a portrait layout mode, wherein the initiating the display of the content comprises initiating the display of the content in the determined content layout mode.

20. The mobile device of claim 17, further comprising program instructions to receive and store mapping data that maps a plurality of content types to respective layout modes, wherein the determining the content layout mode for the content based on the content type is performed utilizing the mapping data, and the determination of the content layout mode is independent of an orientation of the physical display.

* * * * *